United States Patent
Jackson et al.

(10) Patent No.: US 12,046,135 B2
(45) Date of Patent: Jul. 23, 2024

(54) METHOD AND SYSTEM OF PREDICTIVE TRAFFIC FLOW AND OF TRAFFIC LIGHT CONTROL

(71) Applicant: XAN LABS INTERNATIONAL LTD., Guildford (GB)

(72) Inventors: Brian Jackson, Woldingham (GB); Alexander John Brian Jackson, Woldingham (GB); Luke William Brian Jackson, Woldingham (GB)

(73) Assignee: Xan Labs International Ltd. (GB)

( * ) Notice: Subject to any disclaimer, the term of this patent is extended or adjusted under 35 U.S.C. 154(b) by 87 days.

(21) Appl. No.: 17/696,121

(22) Filed: Mar. 16, 2022

(65) Prior Publication Data
US 2022/0327925 A1   Oct. 13, 2022

(30) Foreign Application Priority Data

Mar. 17, 2021   (GB) ..................................... 2103722

(51) Int. Cl.
*G08G 1/081* (2006.01)
*G06V 20/54* (2022.01)
(Continued)

(52) U.S. Cl.
CPC .............. *G08G 1/081* (2013.01); *G06V 20/54* (2022.01); *G06V 20/625* (2022.01); *G06V 40/172* (2022.01); *G06V 2201/08* (2022.01)

(58) Field of Classification Search
CPC ...... G08G 1/081; G06V 20/54; G06V 20/625; G06V 40/172; G06V 2201/08
See application file for complete search history.

(56) References Cited

U.S. PATENT DOCUMENTS 5,357,436 A    10/1994  Chiu
2013/0099942 A1  4/2013  Mantalvanos
(Continued)

FOREIGN PATENT DOCUMENTS

CN    112419726 A    2/2021

OTHER PUBLICATIONS

IET Intelligent Transport Systems, vol. 11, Jan. 3, 2017, Zhao et al, "LSTM network: a deep learning approach for short term traffic forecast", pp. 68-75.
(Continued)

*Primary Examiner* — Curtis A Kuntz
*Assistant Examiner* — James E Munion
(74) *Attorney, Agent, or Firm* — Conley Rose, P.C.

(57) ABSTRACT

A traffic management system for controlling traffic flow in an area is provided. The system has sensors (10) positioned at respective junctions (2) in the area, forming a network of nodes (2). Software (25) processes the sensor signals to derive vehicle signatures indicative of a particular vehicle detected at the node at a particular time. This is used to track the progress of vehicles traveling across the network and derive vehicle statistics (60) as to traffic volumes (64), routes (66) and journey times (62) at various times. Artificial intelligence (AI) (80) trained on historical vehicle statistics arranged to predict traffic arriving at plural junctions at a future time based on receiving a current count of vehicles sensed at nodes in the network. Based on the prediction, a control plan for traffic lights (3) is determined to optimise traffic flow.

12 Claims, 5 Drawing Sheets

(51) Int. Cl.
*G06V 20/62* (2022.01)
*G06V 40/16* (2022.01)

(56) References Cited

U.S. PATENT DOCUMENTS

| | | | |
|---|---|---|---|
| 2018/0096595 A1* | 4/2018 | Janzen | G06V 10/94 |
| 2018/0190111 A1* | 7/2018 | Green | |
| 2018/0211523 A1 | 7/2018 | Ashida et al. | |
| 2020/0042799 A1 | 2/2020 | Huang et al. | |
| 2020/0193815 A1 | 6/2020 | Zheng et al. | |
| 2020/0334979 A1* | 10/2020 | Goncalves | |

OTHER PUBLICATIONS

UKIPO Search Report dated Dec. 2, 2021, for Application No. GB2103722.1.
Extended European Search Report dated Jul. 25, 2022, for Application No. 22162155.0.

* cited by examiner

METHOD AND SYSTEM OF PREDICTIVE TRAFFIC FLOW AND OF TRAFFIC LIGHT CONTROL

CROSS-REFERENCE TO RELATED APPLICATIONS

This application claims priority from GB2103722.1 filed 17 Mar. 2021 entitled "Method and System of Predictive Traffic Flow and of Traffic Light Control", the entire contents of which are hereby incorporated by reference in their entirety.

FIELD OF THE DESCRIPTION

The present description relates to methods and systems of predictive traffic flow and of traffic light control and the control of other traffic management systems, methods of predicting traffic movement and training AI to predict traffic movement and to related software and systems.

BACKGROUND

Traffic lights are installed throughout road networks to control the timing of traffic flows in the various directions. When the traffic light is green for a certain traffic flow direction, i.e., left turn for south bound traffic, vehicles in other directions are stopped. The length of that green light, known as green split, determines how long a queue traffics in each of the stopped direction will accumulate. Therefore, it is beneficial to control the phases and lengths of the green lights according to the traffic conditions in the various directions.

In conventional systems, control is typically performed at individual traffic lights by respective controllers located close to the traffic lights. Presently a large number of signal controlled junctions are still controlled by systems based on fixed timed schedules, which cannot adapt to traffic conditions.

In more sophisticated systems, the system takes account of vehicle detection at traffic signals, e.g. made by an inductive loop system buried in the carriageway, above ground units mounted above signal heads and/or a pedestrian push button demand. For instance, MOVA (Microprocessor Optimised Vehicle Actuation) is a system seen in the UK, which controls the traffic signals based on the presence of vehicles detected on the approach to a signalised junction by inductive loop sensors (typically one close to the junction and one further away). The green timing at the traffic lights is adjusted according to the number of vehicles approaching the junction, and congestion is reduced. Controller can be linked, e.g. at a large intersection, to co-ordinate management. However, generally such methods control one junction at a time rather than looking at traffic flow as a whole across a region and so a traffic light is thus not coordinated with other traffic lights in order to control traffic flows in a large region.

InSync is another system which uses (IP) detection cameras at traffic intersections for detection, rather than induction loops. The cameras are used to detect and quantify the traffic demand situation, in addition to allowing live monitoring of an intersection. InSync monitors and records the number of vehicles in each lane, along with their waiting time. Unlike most traditional control systems, InSync does not use the concept of cycle lengths, splits and offsets. Instead, InSync uses a finite state machine which consists of all possible states within the intersection, and specific states can lead to a signal transition/change.

Some systems include the option for central human control and prediction. Many metropolitan areas have created traffic management centres (TMC) with closed-circuit television (CCTV) cameras, traffic and weather sensors, electronic variable message signs (VMS), traffic signals, and ramp meters to monitor and manage traffic flow on streets and motorways, however most of these still rely on data being given to a person who can make a decision based on that data.

The modern goal when it comes to traffic management is therefore to create a system that can hand this responsibly over to an automated traffic signal control system to manage traffic flow to use roads to their optimal capacity, increasing traffic flow, reducing congestion and traffic jams and pollution within a city or wider area. In some systems, a central computer is used to generate timing schedules off-line based on average traffic conditions for a specific time of day. The schedules are then downloaded to local controllers. The off-line, optimization approach has limitations in responding to unpredictable changes in traffic demand.

Other notable centralised traffic control systems are the "Sydney Coordinated Adaptive Traffic System" (SCATS), developed in Australia, and the "Split Cycle and Offset Optimizing Technique" (SCOOT), developed in the UK.

Both SCATS and SCOOT are complicated, real-time systems that manage large traffic signal networks. These systems provide predetermined, incremental changes in the cycle time, phase split, and offset of traffic signals in their networks. Cycle time is defined as the duration for completing all phases of a signal. Phase split is the division of the cycle time into periods of green signals for the competing approaches. Offset is the time relationship between the start of each phase among adjacent intersections.

SCATS organizes groups of intersections into subsystems. Each subsystem contains only one critical intersection whose timing parameters are adjusted directly by a regional computer based on the average prevailing traffic condition for the area. The basic traffic data used in SCATS is the "degree of saturation," defined as the ratio of the effectively used green time to the total available green time. Cycle time for the critical intersection is adjusted to maintain a high degree of saturation. Phase split for the critical intersection is adjusted to maintain equal degrees of saturation on competing approaches. All other intersections in the subsystem are coordinated with the critical intersection, sharing a common cycle time and having coordinated phase split and offset.

SCOOT uses real-time traffic data collected by sensors located upstream from a signal on the various approaches (typically 3 sensors progressively further away from the junction) to generate traffic flow models, called "cyclic flow profiles." Cyclic flow profiles are used to estimate how many vehicles will arrive at a downstream signal when that signal is red. This estimate provides predictions of queue size for different hypothetical changes in the signal timing parameters. The objective of SCOOT is to minimize the sum of the average queues in an area. A few seconds before every phase change, SCOOT uses the flow model to determine whether the phase change should be advanced by 4 seconds, remain unaltered, or be retarded by 4 seconds. Once each cycle, SCOOT also determines whether the offset should be advanced by 4 seconds, remain unaltered, or be retarded by 4 seconds. Once every few minutes, SCOOT determines whether the common cycle time of all intersections grouped in a region should be altered. However, while SCOOT operates city wide, it effectively breaks down the city into regions in which typically 6 or 7 traffic lights are grouped, e.g. part of an arterial route, and to provide some measure of co-ordination per group, rather than attempting to optimise across the entire area. Furthermore, the number of vehicles detected at a particular junctions is not a reliable indicator that those vehicles will arrive at a downstream junction in the region, as vehicles can turn off that route.

The data collected by such systems does not always accurately measure flow data but a hybrid measure based on flow and occupancy. Installing inductive loops and other sensors in the roads is also often expensive as it may involve digging up the road, and placing sensors in each lane and/or each approach to traffic signals.

Previous works have been carried out to dynamically control adaptive traffic lights. But due to the limited computing power and simulation tools, early studies focus on solving the problem by fuzzy logic, linear programming, etc. In these schemes, road traffic is modeled by limited information, which cannot be applied in large scale.

U.S. Pat. No. 5,357,436 (Rockwell International Cooperation) describes a traffic signal network controlled by an adaptive, fuzzy logic based, distributed system of microprocessors. However a problem with this system is that it is complex to implement and operates on a staged process. A drawback with the Rockwell system is that the system operates on fixed stages in a single agent architecture. This results in a rigid system that does not provide any flexibility for dynamic traffic monitoring at individual traffic junctions.

US2020/193815A1 (Beijing Didi Infinity) shows a system in which motion/GPS sensors in cars are used to determine their trajectory, which is fed to a server. This uses historical trajectory data to adjust traffic light signals (phase/splits) according to the time of day to optimise the flow of traffic. There is also a way of making real-time adjustments to the scheme based on detecting overspill/oversaturation conditions and evaluating various alternative strategies by minimising a cost function.

US2013/099942A1 (Road Safety Management Ltd) discusses an approach using fuzzy logic, in which software in the form of multiple independent agents controls the signals at respective junctions based on sensed traffic conditions at that junction and adjacent junctions using fuzzy logic to model the junction and adaptively control its sequence of lights. Data from all of the agents is sent to a central server for real time modelling of traffic at the junctions, which can be animated in 2D or 3D for display to an operator, and further modelling can be performed off line to evaluate new traffic planning schemes, e.g. implementing one way systems, etc.

US2020/0042799A1 discloses a neural network based system for traffic prediction on a road network, where the predictions may be used to help control congestion or perform other analysis. Flow data between two points (O-D) is estimated based on various sensors. Camera data is used to track volume data between the two points. In addition, GPS data from smart phones associated with the vehicles is used to track individual vehicles between the two points in a particular time period to give "trajectory data". A neural network is trained on the trajectory data and volume data for a later period, so that it can predict future volume data based on current trajectory data.

Embodiments of the disclosure address the above problems by improved methods and systems for adaptive traffic control.

SUMMARY

According to a first aspect of the present description, there is provided a traffic management system for controlling traffic flow in an area, comprising:
plural sensors positioned at respective junctions in the area, forming a network of nodes;
software to process the sensor signals to derive vehicle signatures indicative of a particular vehicle detected at the node at a particular time;
software to process the signature data to track the progress of vehicles traveling across the network and derive vehicle statistics as to traffic volumes, routes and journey times at various times;
artificial intelligence (AI) trained on the historical vehicle statistics arranged to predict traffic arriving at plural junctions at a future time based on receiving a current count of vehicles sensed at nodes in the network; and
based on the prediction, determining a control plan for traffic lights to optimise flow of traffic ahead of the predicted arrival of the vehicles and transmitting control signals to implement the plan to traffic lights at the junctions.

In embodiments, the sensor system in a city provides information about current traffic flow and using historic traffic information predictions can be made about the future traffic flow. Prior art schemes, e.g. as per US2020/0042799A1 discussed above, generally operate by simply counting vehicle numbers in the vicinity of traffic lights and adjusting the lights in accordance with the current or projected number of vehicles arriving, and possibly in coordination with neighbouring lights. However such schemes do not have the ability predict vehicle movement based on learning the probabilities of vehicles tacking different routes in the road network based on the history. Embodiments of this description identify individual vehicles at different nodes in the network, tracks vehicles node to node in the network to determine their routes and directions taken at each node, and based on statistics of these past journeys, learns the routes vehicles are take. The model can then be used to predict vehicles arriving at junctions at a future time based on a current snapshot of vehicle positions in the network and the learned probabilities of vehicle movements. Various sensors can be used, e.g. wireless signal sensors, cameras, etc. The sensor information is used to track vehicles across the city, which gives the Journey time between points across a city and the route of vehicles across the city between the points. Sensor information is also used to count vehicles to know number of vehicles and directions of travel. The information is kept in a database, building a huge number of records for a city over time, e.g. billions, tracking movement of wireless technology standard signals, such as Bluetooth® (hereinafter referred to as Bluetooth for simplicity and familiarity) signals. Each vehicle may be assigned a unique id, tracked across sensors from location to location, i.e. where it came from and where it went, as well as weather conditions and time to improve the accuracy of predictions.

The predicted number of vehicles arriving at a junction may be used to control the traffic signals at that junction ahead of arrival time.

In an embodiment, the AI is trained to learn traffic patterns and predict probabilities of traffic at a junction that will take a particular route to a downstream junction and a particular time to arrive at that downstream junction prediction, wherein the prediction is based on using the probabilities and trip times to calculate a predicted arrival time for the traffic at that downstream junction, wherein the calculation is performed for plural upstream junctions in the network.

In an embodiment the prediction includes the direction traffic is arriving at a junction and/or exiting the junction. Thus, traffic signals can be controlled not only in relation to the number of vehicles arriving at a junction from a particular direction, but also the direction they will take exiting the junctions, so the traffic signals can prioritise the downstream journey.

In an embodiment predictions of the AI are checked against observed probabilities to provide feedback and further improve the accuracy of the AI model.

In an embodiment the AI is arranged to receive time and/or date information relating to the detected trips and learn traffic patterns according to time and/or data, and wherein the AI receives as input the current time and date such that the prediction takes into account time and/or date. The traffic data may be consumed by the model in the context of the time or day or day or week or other temporal information. For instance, weekend traffic patterns may be different from weekday traffic patterns. Rush hour traffic patterns may be different from day time or night time traffic patterns, etc.

In an embodiment the AI receives weather information relating to the time when the trips are taken, and wherein the AI receives as input the current time and date such that the prediction takes into account prevailing weather conditions. This might be taken from a public source, e.g. a website, or a dedicated weather station as part of the system. Again, it has been found that consuming the traffic data in the context of weather conditions improves the accuracy of predictions. Weather is an input vector because it will change the time that traffic will need to get though the roads or change the pattern of traffic flow In an embodiment the AI receives event information and/or calendar information, such that the prediction takes into account current event information and/or calendar information. Similarly, the model predictions can be made more accurate by consuming the traffic data in the context of current events that may affect traffic flows, such as school holidays, public holidays, large sporting events, concerts or other public gatherings in the vicinity, etc. In other embodiments, the AI may learn to recognise events happening in real time from sensor data indicating traffic patterns indicative of an event, e.g. increased traffic volumes on particular routes at particular times in the vicinity of a location, etc, i.e. to recognise an event "signature", and make more accurate predictions of future traffic movements based on this recognition. This is helpful for "unplanned" events, such as road accidents, which can cause changes to traffic patterns.

Thus, various external factors can be used as inputs to the AI to improve the accuracy of predictions. It has been found that by having appropriate external inputs the model starting predictions will be more than 80% and will grow to 98%, for example. Without this information, the prediction accuracy will be much lower.

The AI model may be closed loop so as to determine the accuracy of its predictions in real time and adjust the model to improve accuracy. In an embodiment the artificial intelligence predicts traffic arriving at a junction based on predicted movement of traffic from all directly linked upstream junctions, and at least one additional level of upstream junctions. By tracking the paths of vehicles between multiple nodes across multiple links, the model can learn the probabilities of vehicles seen at one point in the network arriving at multiple downstream nodes. Thus, unlike the prior art, e.g. SCOOT, where a traffic signal may be adjusted according to detected vehicles at that position and one or more upstream positions (e.g. where organised in a SCOOT Region), the embodiment is able to look at vehicle numbers further up the network and take account of where those vehicles are going and when they will arrive, so it can make more accurate predictions further in the future, which greatly increases the usefulness of the predictions in optimally controlling traffic.

In an embodiment the sensors detects a signature of vehicles in the vicinity, wherein the software matches signatures observed between first and second nodes within a time window to determine a vehicle moving between nodes. Thus, the sensor raw data may be processed to derive some unique or at least distinctive signature for individual vehicles that allow them to be tracked between nodes. The sensor data may therefore comprise signature data, which may be anonymised, position data, and time data relating to an observation of that vehicle at a time and place in the network of sensor nodes.

In an embodiment the system compiles a route for each vehicle path across the network by matching the vehicle signature across plural nodes. Thus, "traces" of journeys taken by vehicles across the network can be built up and used to learn probabilities of vehicles seen at one node ending up at other nodes in the future, where this can be several layers of nodes deep, i.e. not just immediately downstream nodes, but nodes two, three, or more removed from the node where vehicles are observed. The matching may take into account the timestamp of when the vehicles are observed at nodes, e.g. matches must occur within a predetermined time limit, either set or derived statistically from the actual data, indicative of the upper range of times taken for a vehicle to travel between those nodes. Similarly, other factors can be used to narrow down the records that must be matched, and so can make the process less computationally expensive and/or can help where the signatures are indicative of a vehicle without being absolutely unique.

In an embodiment the system compiles vehicle statistics in accordance with the routes taken by the vehicles over a time period, the statistics comprising:
vehicle numbers at each approach to each node;
proportion of those vehicle numbers taking each exit from the node;
and average journey time for the vehicles to traverse each link between nodes.

It is found that statistics generated in this form by pre-processing the sensor data are useful for the AI model to learn from and make accurate predictions. The statistics can be generated continually, but are generally "polled" at various intervals to make the training data set. Thus, for instance, every two minutes a snapshot of the statistics can be generated as a training data set record. The predictions can be made at any periodicity required by the control system.

In an embodiment the sensors are wireless signal sensors arranged to detect wireless signals of devices associated with vehicles within range of the sensor and to record at least a device identifier providing a signature for that device.

In an embodiment the sensors are cameras arranged to detect license plates or other visual signatures relating to vehicles.

In an embodiment the sensors are cameras as part of a Facial Recognition system. These can be used to trace vehicles via their occupants, or in embodiments in which pedestrians are tracked, rather than vehicles.

In an embodiment the sensors are cameras arranged to detect a characteristic of a sequence of vehicles, e.g. colour or type, and to match said sequence across nodes to track the route taken by vehicles across the network.

In an embodiment the software pre-processes trip data to classify the traffic as one or more of pedestrian, bike, vehicle, bus, and filters out at least one category of traffic prior to processing by the AI. This allows the AI to focus on traffic types of interest. For instance, the control scheme may be interested in optimising traffic signals for vehicle traffic, rather than bicycles or pedestrians. In this case, the AI would be trained on and make predictions based on only the data of interest.

In an embodiment the control signals are provided to a traffic light controller API, or to an indicative loop vehicle counter as part of a traffic light control system.

According to a second aspect of the description, there is provided a method of deriving training data for training AI to predict traffic flow across an area, the method comprising:
  receiving data from plural sensors indicative of movement of entities forming traffic at various positions across the area, each data including data representing a signature for an individual vehicle; a position in the area, and a time of detection;
  tracking the movement of entities across the area position to position by comparing and matching signature data seen at different positions within a predetermined time period;
  derive statistics as to traffic volumes, routes and journey times at various times and positions in the area based on the tracked movements of individual vehicles; and
  preparing a training data set comprising plural records, each record including an input vector of traffic statistics for positions in the area at a particular time and an output vector of an actual number of vehicles seen at at least one position in the area at a future time period.

According to a third aspect of the description, there is provided a method of training artificial intelligence to predict traffic flow across, the method comprising:
  receiving a training data set comprising plural records, each record including an input vector of traffic statistics for positions in the area at a particular time and an output vector of an actual number of entities forming the traffic seen at at least one position in the area at a future time period;
  training an AI model on the training data set to produce an output indicative of a count of entities at at least one position in the network at a future time, wherein training includes successively feeding the input vectors into the model to make predictions, and feeding back the error between the prediction and output vector to adjust the model parameters.

According to a fourth aspect of the description, there is provided a method of predicting traffic flow in an area, comprising:
  passing current statistics of sensed entity movement to artificial intelligence (AI) trained according to the method described above to predict traffic arriving at plural nodes at a future time based on the current count of entities at nodes in the network.

The methods can comprise using the prediction to control traffic signals, display information to a user, control crowds, etc. and may be applicable to vehicles or people or other entities which can be detected or generate position data that can be attributed to that entity allowing the entity to be tracked.

According to another aspect of the description there is provided a computer program or computer readable medium programmed with a computer program which when executed by a computer causes it to carry out the method described above.

According to another aspect of the description there is provided a system for carrying out the method described above.

It will be appreciated that any features expressed herein as being provided "in one example" or "in an embodiment" or as being "preferable" may be provided in combination with any one or more other such features together with any one or more of the aspects of the present description.

BRIEF DESCRIPTION OF DRAWINGS

Embodiments of the present description will now be described by way of example with reference to the accompanying drawings, in which.

DETAILED DESCRIPTION

Figure 1:
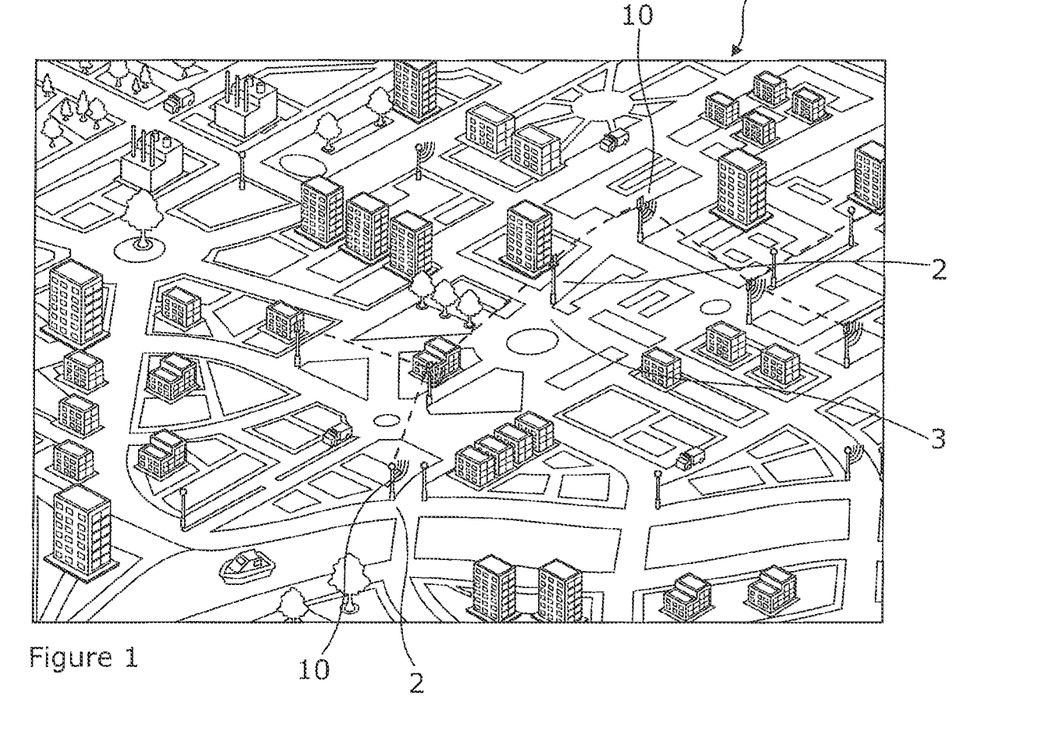
FIG. 1—shows an example of part of a city having multiple sensor units installed at various road side location according to an embodiment of the description.

FIG. 1 shows a view of part of a city having multiple sensor units 10 installed at various road side locations, such as at various junctions 2 or other key locations in the road network. The sensor units 10 may be for example mounted to poles, or attached to other street furniture, such as traffic light units 3, signage, etc. The various sensor feeds are sent to a central server for further processing and/or an Urban Traffic Management Control (UTMC) centre via a communication network as described in more detail below.

Various communications networks can be used, such as for example 4G, WiFi, tunnels over public networks, private LAN/Ethernet networks etc.

The sensor units 10 may be part of a wider system of sensors and devices, e.g. include Traffic Lights, CCTV, Parking Meters, Bus Stops, Pollution Monitors, etc., exchanging information with a central server/UTMC, making up a "smart city" installation. Thus, the sensor feeds required by the embodiments of the present description may be taken from part of a wider existing installation. Alternatively, the sensor units may be entirely separate and/or adapted for use with certain examples of the description.

Figure 2:
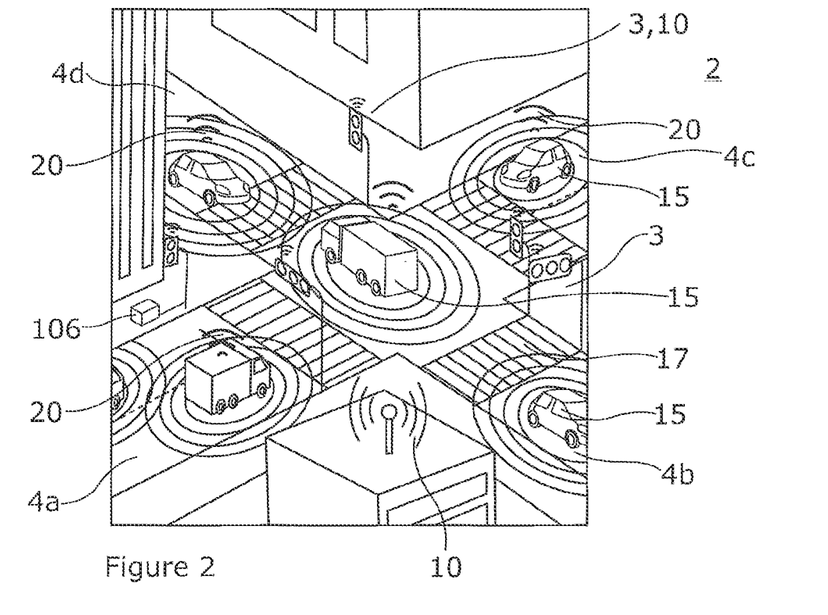
FIG. 2 shows an example junction or intersection controlled by traffic lights within the city according to an embodiment of the description.

FIG. 2 shows an example junction 2 or intersection controlled by traffic lights 3 (also known as traffic signals) within the city 1. Multiple vehicles 15 may travel along intersecting roads from either direction 4a,4b,4c,4d and are controlled by a traffic light 3 at an intersection. Intersection may include a stop bar 17 in each direction, which may serve as a landmark for vehicles to stop, waiting for the green light. It is noted that embodiments disclosed herein are applicable to any forms of intersections with any suitable configuration of traffic lights with more or fewer approaches/lanes, etc.

The signalling of the traffic light is controlled by a traffic signal controller. In some embodiments, traffic signal controller 106 may be mounted inside a roadside cabinet. Traffic signal controller may be configured to generate various traffic control signals according a control scheme.

A traffic control scheme, according to which traffic signal controller 106 operates, generally specifies the controls by phases and stages. A phase refers to a traffic flow direction. For example, intersection 104 may have 12 (i.e., 4×3) vehicle movement phases, one for traffic flow direction. These 12 phases may include: west straight, east straight, north straight, south straight, west left, east left, north left, south left, west right, east right, north right, and south right. In some embodiments, there may be additional phases for other movements such as pedestrians, cyclists, bus lanes or tramways. A stage is a group of non-conflicting phases which move at the same time.

The traffic control scheme controls each phase in cycles, which defines the total time to complete one sequence of signalization for all movements at an intersection. Accordingly, a cycle length defines the time required for a complete sequence of indications. The traffic control scheme may specify the cycle length, such as 120 seconds, 110 seconds, 100 seconds, depending on how frequently the traffic signal needs to switch at the location.

The traffic control scheme also specifies the green split(s) within each cycle. Within a cycle, splits are the portion of time allocated to each phase at an intersection. The splits are determined based on the intersection phasing and expected demand.

As described below, in certain embodiments of the description, the central server makes predictions of future traffic patterns based on the sensor feeds and feed these into the traffic signal controllers 106 to optimise traffic flow in accordance with the predictions, e.g. to reduce congestions, emissions, etc. Generally, at least low level control functions are handled by the signal controller itself, i.e. ensuring the correct sequences and coordination of signals between different lights such that only "allowed" combinations of lights and sequences can be displayed, whereas signals received from the central server control the selection of phases and timings to provide increased "intelligence" based on the prediction. However, more or less of the control function can be centralised at the central server if desired.

Sensors

Sensors 10 detect the presence of vehicles 15 in the vicinity of the junction 2. Various sensor types and signatures extracted from the sensor signals can be used to identify and track vehicles through the network, e.g. wireless signal sensors, cameras, etc. In this example, Bluetooth sensors are used. The Bluetooth sensors detect passing Bluetooth signals 20, for example from passengers' mobile phones, wireless headsets, SatNav systems, in car entertainment systems or other IoT or IoV devices (Internet of Things/Vehicles) that generates a suitable signal that can be detected and includes an identifier that can be uniquely (or near uniquely) associated with a particular individual/vehicle that allows the route taken of the individual/vehicle to be tracked across the network. The sensor devices 10 may for instance have plural antennas (e.g. three or more) using a combination of radios to identify different aspects of the different types of Bluetooth available. Bluetooth signal ranges can be typically 10m or more, and so a single sensor unit mounted, say, to a traffic light at a junction or mounted to a pole near a junction can detect all traffic through that junction. Nonetheless, plural sensors may be used at a single location in some cases, e.g. different sensors may be used to cover different approaches/exits/lanes of the junction.

Although in this example, Bluetooth sensors 10a are used, other sensor technology can be used, as described below. For instance, camera feeds 10b can be used to identify and track individuals/vehicles across the network, such as CCTV facial recognition, camera based ALPR (Automatic Licence/Number Plate Recognition) or other visual signature recognition schemes, etc, can be used in other examples. Where cameras are used as sensors, it is typically necessary to have more than one cameras to cover a particular junction, as they are more sensitive to direction, and multiple cameras are often beneficial to focus on different approaches/lanes to more accurately identify all vehicles moving through an area.

In an example, sensors 10 are placed across a region 1, e.g. a city, at key junctions or points, e.g. along arterial roads, exits from motorways, particular points of congestion, to achieve a network of coverage at important points across the region. In some examples, at least some sensors are in the vicinity of junctions 2 having traffic signals 3 being controlled by the system—however, some sensors and traffic signals may cover similar areas but not precisely coincide. Sensors can be added/removed/moved in the network at a later point, although the model may have to be retrained.

Figure 3:
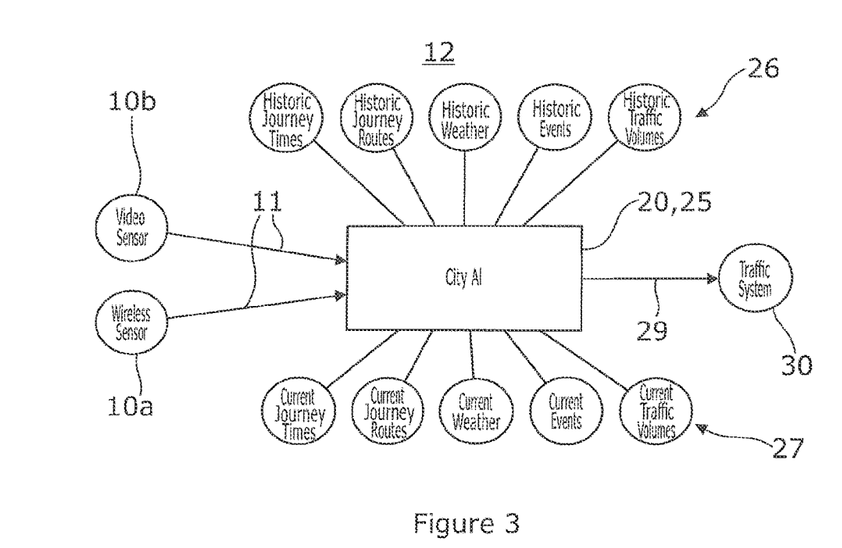
FIGS. 3 and 4 show examples of a system according to an embodiment of the present description.
Figure 4:
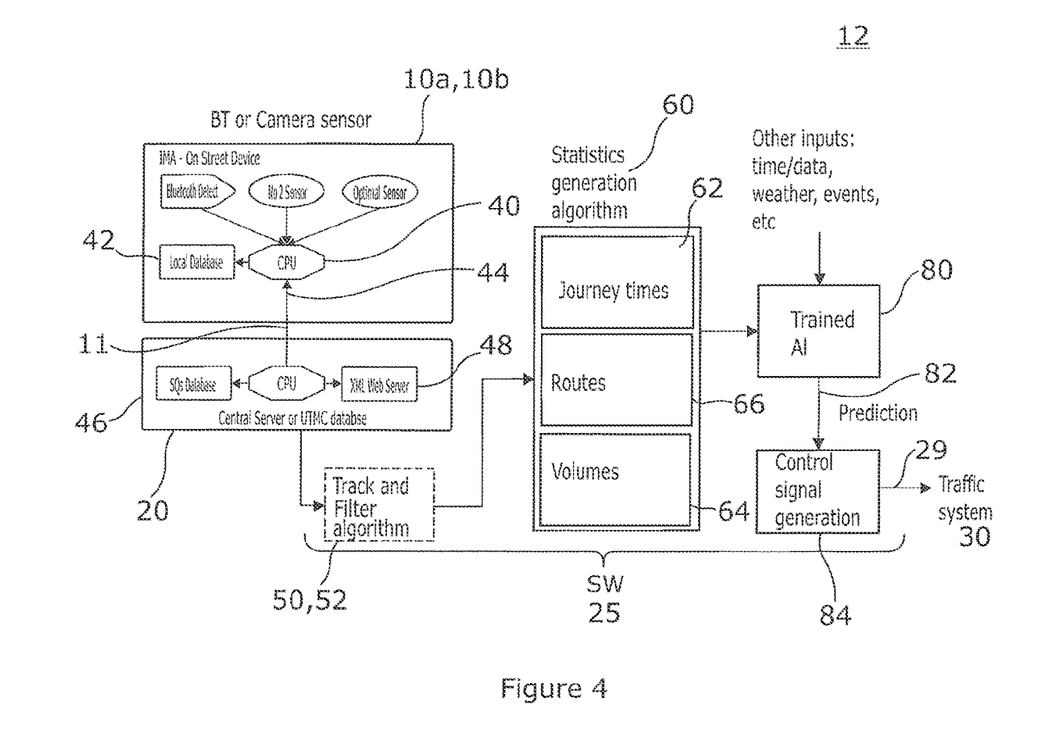

FIGS. 3 and 4 show the sensor feeds 10a,10b being processed by the central server 20 to provide predictions of traffic movements and to control traffic light signals to reduce congestion and provide other benefits. As shown by FIG. 3, a key part of the central server is the software/AI system 25 which receives various inputs, including the sensor feeds 10a,10b from the wireless/BT sensor and/or camera/video sensors, and various real time 27 and historical 26 statistics derived from the sensor inputs, and other environmental inputs, and provides as output signals 29 to the Traffic System 30 to control the traffic lights according to predictions made by the AI.

FIG. 4 shows further detail of the overall system architecture. The local sensor 10 devices comprise a built in computer 40 to analyse the signals and store in a local database store of detected signals. Typically a record will include a timestamp of when the Bluetooth signal is detected, and an identifier from the Bluetooth signal, such as the unique Bluetooth Addresses and Name of the device. In some cases, it may be desirable to anonymise the identifier, e.g. by performing a non-reversible algorithm, e.g. hashing and salting the data, prior to further processing. The unit has a communication interface 44, e.g. an ethernet interface that connects to an existing network or it can be connected to a 3G or 4G circuit, by which it transmits the records in real time or periodically up to the central server 20 and optionally UTMC database. There they are stored 46, e.g. in a SQL database, or made available in real time in a XML or JSON feed 48 via a webserver. This provides real-time movement information of vehicles in the city for further processing by the AI to make predictions and optionally to a UTMC for other purposes.

It will be appreciated that different sensor types will capture different information, e.g. the camera will process the raw image streams to identify license plate information which is used to derive an anonymous identifier.

Processing Sensor Data—Tracking Vehicles

The software 25 at the central server then performs further processing on the sensor data.

First an algorithm 50 is performed to track Bluetooth signals across locations, i.e. between detection by different sensor nodes 10,2. Should a Tag for a vehicle be detected at a sensor node 10 downstream on the link 4 (i.e. connection between nodes) in question, i.e. a tag "matches" between connected nodes, a travel time between those nodes is then calculated on the basis of the timestamps. In some examples, the system may look for a match within a particular time window, generally equal to the expected range of journey times between particular nodes, to reduce the computational effort in matching. Furthermore, the system may look for matches based on the direction of travel of an observed vehicle. Thus, a vehicle seen travelling east from a junction can be expected to be seen at a subset of downstream junctions that are generally in that direction of the original junction.

Filtering/Classification

For some implementations and/or when using some sensor types, it may be necessary to include a further processing step 52 to filter out traffic that is not of interest and/or classify according to various traffic types. For instance, the system may be only interested in vehicular traffic. When the sensors used are number plate recognition systems, then this is not a problem. However, a Bluetooth sensor system will pick up cyclists, pedestrians, and static Bluetooth devices. Furthermore, a single vehicle may emit more than one Bluetooth signal, e.g. from mobile phones of multiple passengers, which could lead to an unwanted determination of more than one vehicle being present. The filtering step can track the movement of a Bluetooth device or devices across the city and applies a profile to classify the traffic. Generally, statistical methods can be used to separate out the various classes of vehicle based on the data. A statistical engine outputs streams of data of different types to separate out the different types, e.g. buses from cycles, etc.

For instance, the movement profile of a pedestrian or cyclist will be different to a car or lorry and will have a different movement signature, which can be detected and used to filter out signals that are not of interest or classify the data. Bluetooth signals that are consistently detected together across the network may be associated with a single vehicle. Or Bluetooth signals may be cross correlated with other sensor feeds at points in the network, e.g. a camera feed, to identify types of vehicle or vehicle occupancy. In some embodiments, type of vehicle is used to provide particular control of signals, e.g. prioritising emergency services, public transport or taxi traffic. Thus, even where a reliably unique identifier is identified by the sensors, e.g. ALPR, a prefiltering step may be useful to obtain one or more subsets of vehicles of interest.

The result is data tracking vehicle journeys of interest over links between the network of nodes.

Statistics Algorithm

The software 25 at the central server processes the matched and filtered data and calculates streams of statistics 60.

First it calculates an average journey time 62 for each link using the matched tags for a particular period, i.e. polling the data at a particular time period. For instance, journey times for the link can be calculated every 2 minutes. Journey times can be calculated at faster periods, down to, say, every second or faster, if required, but there may not be enough data to calculate meaningful journey times at much faster periods, and this creates a processing overhead. Nonetheless, a reasonable short period is useful, as it allows better accuracy on the prediction. Thus, typically a period from 30 seconds to 5 minutes is useful, although longer periods can be used in some cases.

The central server also calculates volumes of vehicles 64 at each node 2. In an example, this is done for traffic arriving (or departing) in every direction 4. Thus, for a junction with 4 approaches 4, the number of vehicles travelling on each approach within the time period is calculated. It will be appreciated that a single Bluetooth sensor 10 at a junction 2 may not be able to determine which approach a vehicle has travelled on, since it may cover multiple approaches and has limited directional detecting ability. However, as the system tracks the route taken by the vehicle 15 through the network of sensor nodes 10,2, the link 4 taken between each node pair can be ascertained and so the system can calculate the numbers travelling on each link.

The central server also calculates statistics relating to journey routes 66 taken. In the present example, the server calculates for each approach to a junction, i.e. a link to a node in a particular direction, the proportion of vehicles taking each exit link within the given time period. For instance, for the above exemplary junction with 4 approaches, 30% of vehicles on a particular approach might turn left, 20% might proceed straight on, and 50% might turn right within the time period.

These statistics are calculated successively for each approach for each junction, i.e. for each link and node, for each time period. The output is a stream of timestamped (down to say a sub-second or millisecond time) statistics for each vehicle type (or whichever type(s) of vehicle are of interest). Each record provides a measure of how much traffic there is, where it is going and how long it takes to get there, broken down granularly at a link/node level and at a time period level, which allows the AI to learn and predict future movements with additional insight.

Although the software processing of the sensor data is shown as being performed at the central server, it is possible for each sensor unit to perform some or all of this processing to obtain journey statistics, i.e. times, routes and volumes of traffic, for its node and the links coming into that node by sharing detected information with neighbouring nodes so that it can track a vehicle through its junction from a downstream node to an upstream node. This avoids having very large data pipes to transmit the raw sensor data to the central server. Thus, if desired, this processing can be distributed at the "edge" of the network so that the central server receives these statistics from the sensor units already in a form for further processing by the AI, rather than the statistics being computed centrally. As discussed, the units may be connected by wireless mesh, to enable sharing of data with neighbouring nodes. Furthermore, by breaking down the processing between different algorithms/software modules, the output can be checked at each stage making sure it is within expected bounds and improving accuracy of results. Nonetheless, it will be appreciated that the central software/AI can be very powerful and in other examples, the central AI element can handle all of the processing of the data if suitably configured.

As mentioned above, other sensor types may be used. In principle, any sensor type can be used that is capable of detecting a signal that allows a particular vehicle to be identified and tracked between sensors. IP cameras may be used as another type of data. In one example, an automatic number plate recognition system may be used, which allows vehicles to be tracked across the network of sensor nodes. Such systems are sensitive to the direction of camera relative to the vehicle, and may therefore require more sensors to cover a junction to identify all vehicles compared to, say, an omnidirectional Bluetooth sensor. Depending on the positioning of the camera, the license plate may be obscured when the vehicle is in traffic. (Similarly facial recognition systems linked to the cameras can be used if it is desired to track pedestrian or cyclist movement).

Other visual signatures may be used which are more tolerant to vehicle alignment. For instance, taxis or lorries may carry identification numbers or branding, which provides a trackable visual signature. In one example, particular sequences of vehicles can provide a signature that can be tracked where some or all sensors detect a non-unique signal from the vehicle and the sequence of such non-unique signals from a string of vehicle provides uniqueness (or close to uniqueness). For instance, a closely spaced sequence may be recognised by the camera and signal processing unit as: red car, yellow car, lorry, black cab, silver car. Such a sequence may be picked up at subsequent junctions/sensors, allowing the trips of each vehicle to be tracked. Of course, vehicles may join/exit the sequence in between sensors such that the precise sequence is not maintained. However, by using sufficiently long/detailed sequences, and by using fuzzy matching algorithms and correlating with other temporally and/or spatially close by sensor feeds, it has been found that reasonable accuracy may be achieved.

The system 12 may use a combination of sensor types, e.g. wireless and camera, according to the needs of the junctions being monitored.

Whatever method of tracking vehicles is used, the system 12 derives the aforesaid statistics of journey times, volumes and routes.

It is not necessary to track every single vehicle across the network to derive these statistics. The average journey times and routes taken statistics can be obtained reasonably accurately from tracking a subset of vehicles, and the volume of vehicles statistic can be scaled up proportionally from the subset to the total number of vehicles detected. Only sufficient data are required to train the AI to make accurate predictions. For making real time predictions of future traffic movement, the current count of vehicles at each junction is more important, and can be determined without necessarily identifying and tracking each vehicle.

Figure 7:
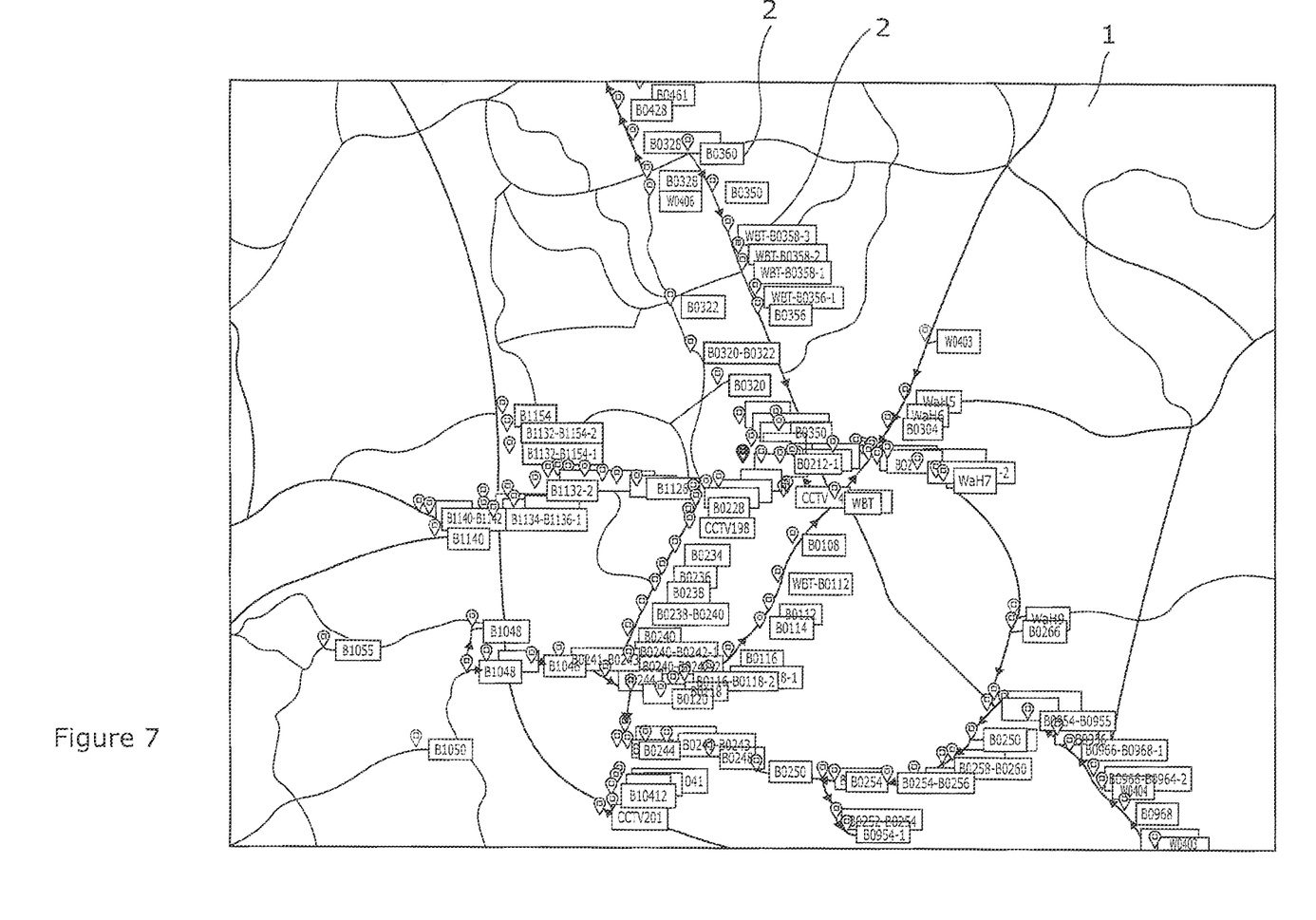
FIG. 7 shows an example of a map showing the monitored junctions with overlayed information indicative of current and/or predicted traffic movements.

A geolocation map may be displayed to an operator showing the various nodes mapped to GPS locations, for example as shown in FIG. 7. Each node can show expected vehicles arrivals. This can be overlaid in real time as a layer in a map, as part of a GIS system, to allow operators to monitor real time conditions and expected future conditions.

System

Thus, returning to FIG. 4, various processing of the sensor data 11 is carried out to put it into a form ready for the AI system 80, i.e. the traffic statistics 60 described above. These are stored in a historical database 26, along with external data, such as weather data and current event data, as well as being made available to the AI in real time. As described below, the historical data 26 is used to train the AI to allow it to learn traffic movements patterns and derive further insights. The AI 80 receives the traffic statistics data and other data in real time, and predicts traffic arriving at a junction 2 from a particular direction 4 at an upcoming time period. The output 82 is produced as a continuous vehicle numbers and times, which are produced as frequently as necessary for the traffic system to be able to adjust. Using these predictions 82, suitable control signals 29 are derived 84 and transmitted to the traffic system/traffic lights 30 to change the traffic light timing in anticipation of the number of vehicles and their expected destination for all vehicles approaching that junction and every junction up route and down route. This allows the system to optimise their cycles to control traffic and achieve the desired outcome, i.e. reduced congestion, reduced emissions, priority for emergency service vehicles, etc. Nonetheless, the predictions of future traffic movements may be used in many applications in controlling aspects of a smart city to improve user experience or provide further services.

Modelling

Figure 5:
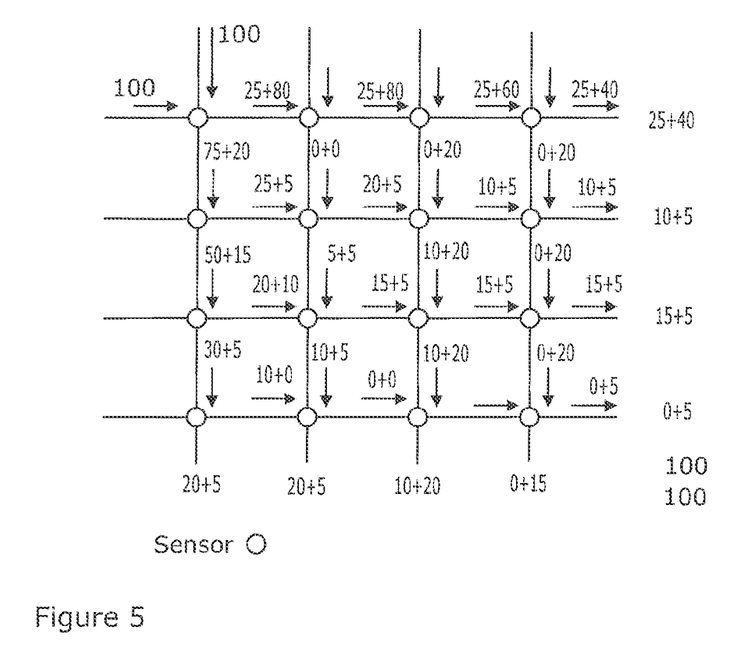
FIGS. 5 and 6 shows an example of analysis of traffic performed by the system of FIGS. 3 and 4.
Figure 6:
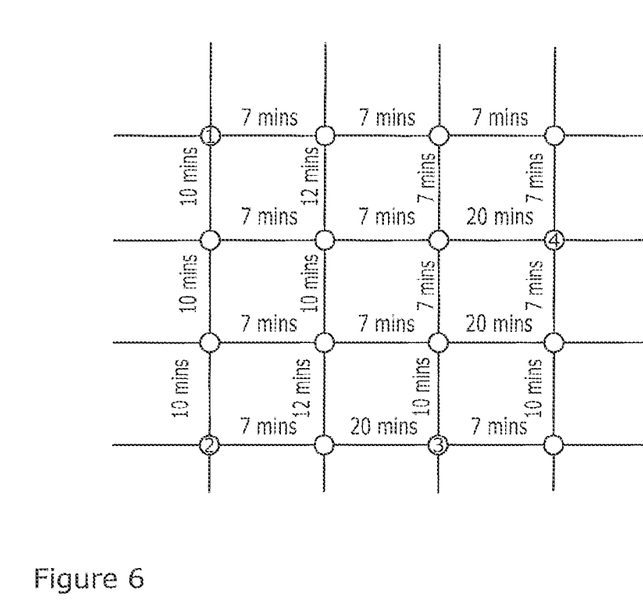

FIG. 5 shows an analysis of traffic from a single node entry into the road network and FIG. 6 shows an illustrative analysis of traffic trip times between single nodes in the same road network from which the AI learns.

Referring to FIG. 5, as described above, the software tracks vehicle movements between nodes over time to create a probability matrix which determines that any particular node/junction the cars will travel through a number of other junctions. This is input to the AI for training. The status is consumed in terms of external information that is not essential but helps improve the accuracy of the prediction. For instance, the data is consumed in the context of weather information, in terms of school holidays, in terms of days of the week (e.g. weekday or Saturday or Sunday), hours of the day, and other external events (e.g. an event at a local venue that attracts a large attendance and affects traffic in the vicinity, as for instance scraped off internet webpages/feeds or manually collated) and is formed into a probability matrix which states that any vehicle approaching point A on the map will have a certain probability of appearing at each of points B, C and D on the chart.

Furthermore, the AI knows the journey time between those points from FIG. 6 because that is a calculation happening in real time will allow an estimate of the number of vehicles at any particular junction from any particular angle.

Thus, in FIG. 5, it can be seen that at a particular node (top left of grid) 100 vehicles enter from the north approach. 25 of these exit East (i.e. 25%) along a path that takes 7 minutes to traverse, and 75 exit South (i.e. 75%), along a path that takes 10 minutes to travel to the next node (as shown by FIG. 6). Of those exiting east and approaching the next node, all 25 vehicles exit that junction to the east (i.e. 100% of those entering) along a path that takes 7 minutes to travel, and none to the south (0%).

The probability matrix can be built up for all nodes in the network, as learned by the AI. Although the matrix shows flows generally from the north and west to the south and east, it will be appreciated that the matrix is build up for traffic approaching a junction from all directions, and exiting in all directions. A grid road network is shown for convenience, but the road network can have any layout with any number of roads leading to a junctions.

To move between two nodes (e.g. node 1 and node 3 in FIG. 6), various paths could be taken through the network. For each path, the total time and the number of vehicles taking the path can be calculated from the current number of vehicles seen at node 1, the probabilities of taking a particular route (product of individual probabilities of taking the route at each junction) and leg times (sum of leg times for each leg of path). This gives a prediction of what traffic is arriving at node 3, at which time and from which direction. This exercise is performed for traffic originating at, for example, each node in the network and for traffic arriving at each node from each direction.

Thus, a profile can be built up for node 3 of expected number of cars arriving at various points in a future time period, e.g. in the next 30 minutes, and from each direction. This can be done for each node in the network, to build up a picture of future traffic flows.

Furthermore, the system has the probability estimates at that junction of where the traffic is going to go, i.e. exit the junction. The software can use this information to form that predicted traffic into optimal traffic flow via sending suitable control signals to the traffic system.

It will be appreciated that the calculation is in essence deterministic and mathematical and could be performed mathematically, e.g. via multivariant regression analysis, based on the current statistics (e.g. as shown in FIGS. 5 and 6) to extrapolate from the current volumes, routes and trip times to find where the traffic will be at some future point. However, using an AI to learn based on the data is found to improve accuracy and is thus useful in most cases. For instance, the AI model will learn a better representation of underlying traffic flows, and can dynamically change model, e.g. by real time comparison of its predictions with actual observed data.

It will be further appreciated that the matrix need not be a grid layout, or need not be fully connected. For instance, a sparse matrix may be used in some situations, e.g. where some nodes are not used.

Control Signals

There are several mechanisms for generating control signals 29 based on the predictions. Generally various schemes are known for adjusting traffic signals responsive to a current picture of traffic, e.g. to reduce congestion at a particular part of the city. Broadly such techniques can be used with the predicted traffic generated by examples of the present description, with the advantage that the control is not just reactive to problems emerging, but can pre-empt such problems occurring because the AI predicts where the vehicles will be and where they are going. From this, the AI can work out the probable number of vehicles coming from each direction to a location. If this is done, say 10 mins ahead, the system can adjust the traffic signals to align in real time that the flow that will appear will go through. It will be appreciated that it takes time to cycle through lights, so queues can build up at each set of lights. The mathematics of queues means that the queue has memory, i.e. when a queue forms the disruption will remain even after the initial congestion has passed. Therefore the AI adjusting to expected conditions helps keep the traffic flow smooth.

Thus, signals can be set 10 minutes in advance according to predicted arrival. On a city wide level, the system can predict what units arrive from each direction, change timing of the lights, and then reforecast. The process continues real-time forecasting. Thus, the system accurately anticipate traffic based on history using a mathematical model. Although the calculation does not necessarily require AI, i.e. it could be done via an extensive series of calculations, the nature of the probabilistic deterministic approach makes it well suited for an AI implementation.

For instance, a simple mechanism is adjusting the time that traffic lights are open to clear expected build up. Another option is to optimise vehicle "trains" whereby a group of 20 or 50 or 100 vehicles is allowed to travel across the network in an optimal manner by coordinating a run of green signals.

The software can take into account other factors captured by the system, e.g. weather, events, classification of vehicles, and combinations thereof. The software may for instance take into account the weather for the area and the type of vehicle passing through, so priority might be given to not keeping heavy goods vehicles waiting because of the dangers of pollution.

Data can then be sent to Traffic Systems and other Smart City applications to mitigate the event, to take measures to optimise traffic flows and so help pollution.

In embodiments, the system can take over the loop counters in road and feed in artificial numbers, e.g. instead of counting the 6 vehicles actually present, the system predicts 20 vehicles are coming so this number is fed into the loop counter in advance. Inductive loops work by detecting metal objects (such as vehicles) that pass over them and cause a change in the magnetic field that is induced in the loop for the time taken for the vehicle to pass over the loop. This change in magnetic field causes a pulse which registers as a vehicle demand in the controller, which generally polls the loops every second. Thus, in this example, the embodiment creates a number of phantom loops in the road, each phantom loop being for a different time in the future. The forecast may be created, for instance, for the maximum number of minutes that a traffic lights will cycle through. Thus, the system can interfaced with existing traffic management systems by feeding in its own predicted signals.

Alternatively, the system can replace existing systems, by feeding directly into a traffic light controller via software API. Generally, the system attempts to optimise some goal or figure of merit, such as minimising pollution or journey time, and various optimisation techniques can be used to optimise that goal by control of all of the traffic junctions or a critical number of the traffic junction in that area it can optimise it for the whole area based on the predicted traffic information.

Various strategies can be employed to achieve particular goals in particular situations, i.e. the changes that can be made to the operation of the traffic signals to reduce the congestion or move it to a more acceptable location. These include the following.

Entry gating is designed to reduce the amount of traffic entering a critical part of the network so as to avoid oversaturation within the critical area. Gating can be implemented just at the local intersection, progressively along an arterial, or at the edges of the controlled area to protect a large part of the network.

Opening an exit will allow traffic to leave a congested network more rapidly than with the standard signalisation. Like gating, it can be applied either as a local tactic, or a progressive linear one.

Preventing blocking crossing traffic is meant to start the red to the main road feeding the congested link before the exit to the junction becomes blocked, that is whilst the main road traffic is moving relatively freely. Changing the signals at this time minimises the probability of having a queue of main road traffic blocking back through the junction and preventing the crossing traffic moving during its green time.

Giving priority to a particular traffic stream is designed to provide green time for traffic that tries to join the congested stream from a specific upstream link when they can effectively use this green time, i.e. when the back of the downstream queue is moving.

Ensuring full utilisation of exit capacity is a tactic that applies to short links where congestion is building up because the existing green time cannot be fully used due to an inappropriate offset.

Various tools can then be used to implement the strategies by changing elements of the signal plan. These may include the following.

Double cycling, which can be used when traffic would flow better in several small platoons rather than fewer large ones, either because of the lack of storage space for long queues or to condense the platoons crossing the stop line.

Decreasing the cycle time for the whole network, or a subnetwork where this can be created with reasonable borders, may be an alternative when double cycling is not feasible for some reason e.g. because it would reduce the capacity too much due to large inter green times.

Increasing the cycle time is the standard response when traffic volumes increase in a network of subnetwork.

The purpose of a reduced offset is to avoid congestion through avoiding blocking back together with unused green time at the downstream intersection that leads to inefficient use of the green time upstream and, if demand is high, to congestion building up upstream. Another possibility to use the offset is for platoon compression to protect short links, if the green time upstream is larger than downstream.

Increasing green time at the downstream signal, within the given cycle time either in line or over proportionately with increasing the cycle time, is a standard tool to increase capacity at the downstream signal in a congested link. Decreasing the green time at the upstream signals can be useful to avoid oversaturation for the downstream link with the consequence of blocking back, and in those cases for which double cycling, platoon compression or double green have-to be considered.

AI Training Procedure

Figure 8:
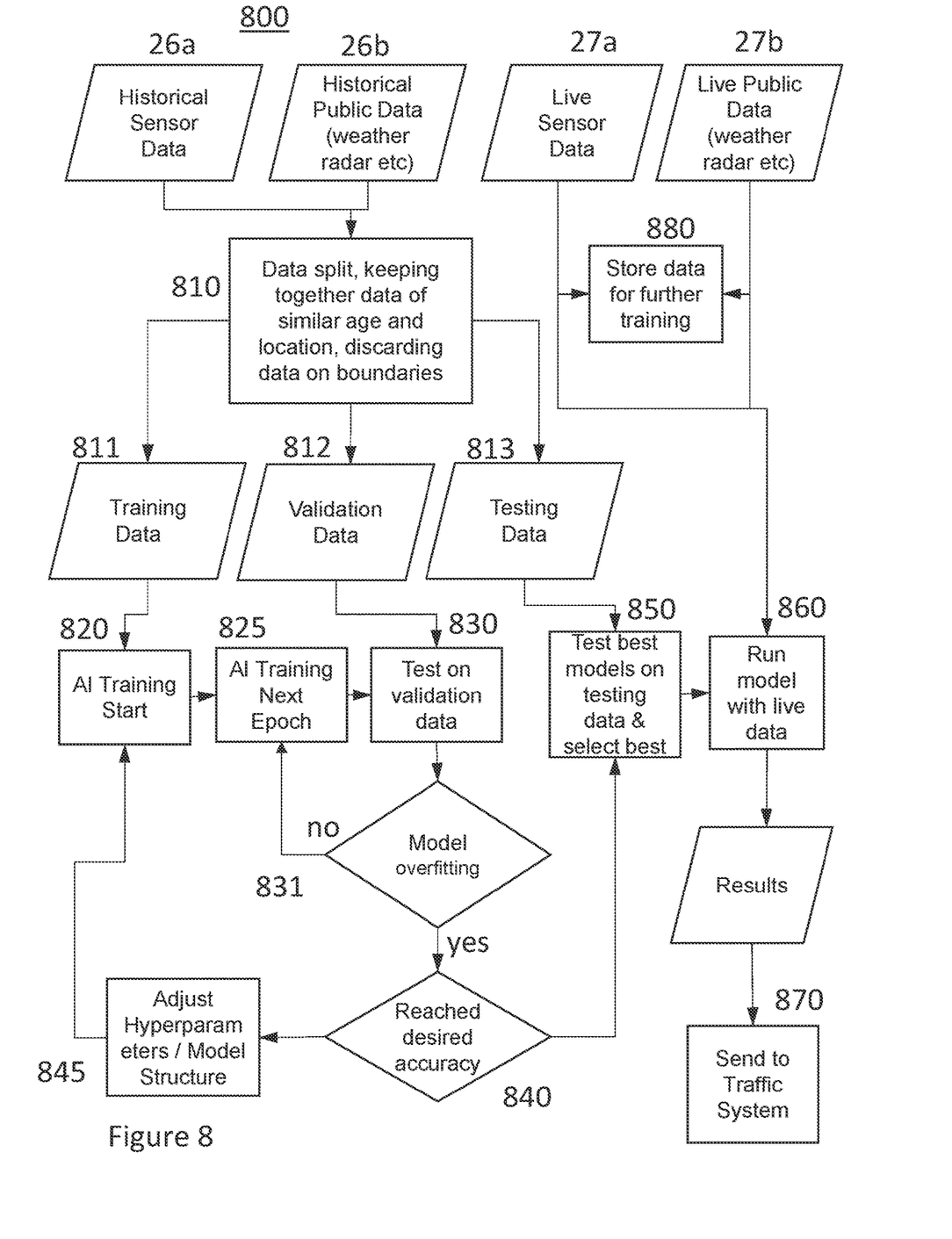
FIG. 8 shows an example of a flow diagram for the training and operation of the AI.

The AI takes the form of Machine learning (ML), i.e. computer algorithms that improve automatically through experience. Machine learning algorithms build a model based on sample data, known as "training data", in order to make predictions or decisions without being explicitly programmed to do so. FIG. 8 shows an example flow 800 of the training and operation of the AI.

At step 810, the historical data, e.g. 12 weeks data, is split into various sets, namely a training data set 811, a validation training set 812, and a testing data set 813. Training commences at step 820 with a base model, e.g. a neural network with x layers of y neurons, etc. The AI consumes the training set, comprising input vectors comprising the historic traffic statistics 26a for each node and related environmental/event data 26b, and the output vector comprising the traffic statistics at the future time period. The AI makes a prediction (which is likely to be inaccurate to begin with) for the traffic statistics at the future time period based on the input vector, and the error calculated according to a suitable metric according to the model, i.e. the difference between the actual statistics and estimated statistics. The error is back propagated through the network and the model weights adjusted to improve the accuracy of the prediction 825. This iterates through the training data set, i.e. one epoch, with the model gradually learning to make better predictions.

As the model is trained on the data, with each epoch, the model weights adjust to more closely learn the data. The weights go from underfitting the data, to fitting the data, to eventually overfitting the data. To prevent overfitting, at step 830, at the end of an epoch, the model is tested on the validation data set and records the resulting errors. It then passes 831 through the entirety of the training data again, this process is continued until there is no further increase in accuracy on the validation data for several epochs, as the model will begin to become overfit on the training data, i.e. the model begins to learn the training data well but fails to generalize the knowledge to the validation data. If there is no overfitting, the model is trained on the next epoch.

If overfitting begins to be seen, at step 840, a check is performed to see if the desired accuracy has been reached based on the validation data error. If not, the model hyperparameters that control the structure of the model are adjusted at step 845 and the training process begins again on the new model, and the results from the validation data are used to judge the successfulness of each model. If repeated adjustments of hyperparameters are insufficient to reach desired accuracy, the structure of the model may be adjusted in more extreme ways.

Once the desired accuracy is reached 850, a selection of models with the highest validation data results are tested on the testing data, and the one with the highest accuracy, and the most desirable over prediction/under prediction ratio is selected to be used. This model is then fed live data at step 860 and the results are sent to the traffic system 870. To further increase accuracy the live data is also stored 880 for further training. Thus, the AI can test its predictions against the observed data in real time and continually adjust the model. The live data is also stored in the historical store for use in future training.

Graphic processing units (GPUs), often with AI-specific enhancements, are suitable for training large-scale commercial cloud AI. nVidia® AI hardware (e.g. GEFORCE RTX 3090 may be suitable at time of writing) may be used in an embodiment.

Embodiments of the present description have been described with particular reference to the examples illustrated. However, it will be appreciated that variations and modifications may be made to the examples described within the scope of the present claims.

The invention claimed is:

1. A traffic management system for controlling traffic flow in an area, comprising:
   plural sensors positioned at respective junctions in the area, forming a network of nodes with links between the nodes;
   software to process signals generated by the sensors to derive vehicle signatures indicative of each vehicle detected at the node at a particular time;
   software to process data indicative of the vehicle signatures to track routes of vehicles traveling across the network by matching the signature of each vehicle across plural nodes within a time window, and generating vehicle statistics at various times, wherein the vehicle statistics comprise, for each time:
   vehicle numbers on each link approaching a node;
   a plurality of probability matrices, wherein each probability matrix is for a particular link approaching a node, and indicates probabilities of a vehicle approaching on the particular link subsequently exiting the node and later arriving on links approaching the other nodes of the network; and
   average journey times for the vehicles to traverse the links between nodes;
   software to predict future traffic movement by:
   applying artificial intelligence (AI) trained on historical vehicle statistics arranged to learn traffic patterns by predicting the probability matrices based on receiving a current count of vehicles sensed at nodes in the network;
   building, for each node, a profile of an expected number of vehicles arriving on each approach link to that node and arrival times of the expected number of vehicles over a future time period, wherein the expected number of vehicles arriving on a particular approach link is based on the current count of vehicles at each upstream node combined with the probabilities from the predicted probability matrices of a vehicle at the respective upstream node arriving on the particular approach link, and wherein the arrival times are based on a current average journey times between the upstream nodes and the particular approach link; and determining, for each node, from the predicted probability matrices which links the vehicles will exit the node; and software to provide the predicted future traffic movements to a traffic control system that, based on the predicted future traffic movements, determines a control plan for traffic lights at plural junctions to optimize flow of traffic ahead of the predicted arrival of the vehicles and transmits control signals to traffic lights to implement the control plan at the plural junctions.

2. The system of claim 1, wherein predictions of the AI are checked against observed probabilities to provide feedback and further improve an accuracy of the AI model.

3. The system of claim 1, wherein the AI is arranged to receive time and/or date information relating to detected trips and learn traffic patterns according to time and/or data, and wherein the AI receives as input the current time and date such that the prediction takes into account time and/or date.

4. The system of claim 1, wherein the AI receives weather information relating to the time when trips are taken, and wherein the AI receives as input the current time and date such that the prediction takes into account prevailing weather conditions.

5. The system of claim 1, wherein the AI receives event information and/or calendar information, such that the prediction takes into account current event information and/or calendar information.

6. The system of claim 1, wherein the AI model is closed loop so as to determine an accuracy of its predictions in real time and adjust the AI model to improve accuracy.

7. The system of claim 1, wherein the artificial intelligence predicts traffic arriving at a junction based on predicted movement of traffic from all directly linked upstream junctions, and at least one additional level of upstream junctions.

8. The system of claim 1, wherein the sensors are wireless signal sensors arranged to detect wireless signals of devices associated with vehicles within range of the sensor and to record at least a device identifier providing a signature for that device.

9. The system of claim 1, wherein the sensors are one or more of:
   i) cameras arranged to detect license plates or other visual signatures relating to vehicles;
   ii) cameras as part of a Facial Recognition system; and
   iii) cameras arranged to detect a characteristic of a sequence of vehicles, including color or type, and to match said sequence across nodes to track the route taken by vehicles across the network.

10. The system of claim 1, wherein the software pre-processes trip data to classify the traffic as one or more of pedestrian, bike, vehicle, bus, and filters out at least one category of traffic prior to processing by the AI.

11. The system of claim 1, wherein the control signals are provided to a traffic light controller API, or to an indicative loop vehicle counter as part of a traffic light control system.

12. A method of controlling traffic flow in an area using a traffic measuring system, the method comprising:
    obtaining sensor signals from a plurality of sensors positioned at junctions in the area, wherein the sensors from a network of nodes with links between the nodes;
    processing the sensor signals to derive vehicle signatures indicative of each vehicle detected at the node at a particular time,
    processing the vehicle signatures to track routes of vehicles traveling across the network by matching the signature of each vehicle across plural nodes within a time window, and generating vehicle statistics from the sensor signals at various times, wherein the vehicle statistics comprises, for each time;
        a plurality of probability matrices, wherein each probability matrix is for a particular link approaching a node, and indicates probabilities of a vehicle approaching on the particular link subsequently existing the node and later arriving on links approaching the other nodes of the network; and
        average journey times for the vehicle to traverse the links between nodes;
    predicting future traffic movement by:
        applying an artificial intelligence (AI) system trained on historical vehicle statistics to learn traffic patterns by predicating the probability matrices based on a current count of vehicles senses at the nodes; and
        building, for each node, a profile of an expected number of vehicles arriving on each approach link to that node and arrival times of the expected number of vehicles over a future time period, wherein the expected number of vehicles arriving on a particular approach link is based on the current count of vehicles at each upstream node combined with the probabilities from the predicted probability matrices of a vehicle at the respective upstream node arriving on the particular approach link, and wherein the arrival times are based on a current average journey times between the upstream nodes and the particular approach link; and
    controlling a plurality of traffic light signals based on the predicted future traffic movement and a control plan for traffic lights at plural junctions to optimize flow of traffic ahead of the predicted arrival of the vehicles.

* * * * *